No. 781,389. PATENTED JAN. 31, 1905.
J. S. BANKS.
CLOTHES PIN.
APPLICATION FILED SEPT. 29, 1904.
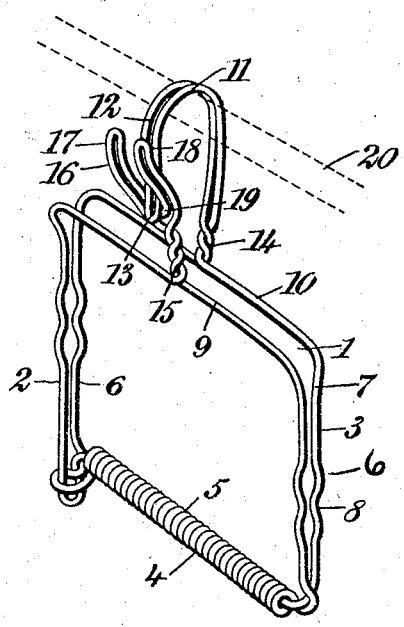
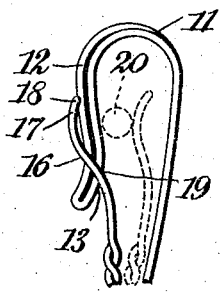
WITNESSES:
INVENTOR
John S. Banks
BY
ATTORNEYS No. 781,389. Patented January 31, 1905.

UNITED STATES PATENT OFFICE.

JOHN SCOTT BANKS, OF PORTSMOUTH, VIRGINIA.

CLOTHES-PIN.

SPECIFICATION forming part of Letters Patent No. 781,389, dated January 31, 1905.

Application filed September 29, 1904. Serial No. 226,470.

*To all whom it may concern:*

Be it known that I, JOHN SCOTT BANKS, a citizen of the United States, and a resident of Portsmouth, in the county of Norfolk and State of Virginia, have invented a new and Improved Clothes-Pin, of which the following is a full, clear, and exact description.

This invention relates to clothes-pins such as used to suspend clothes upon a line to dry.

The object of the invention is to produce a device of this class which is very simple in construction and which may be readily applied to a line at any point, operating effectively to support the clothes which may be attached thereto.

The device is preferably to be formed of wire; and more specifically the invention consists in the construction and form of the pin to be more fully described hereinafter and definitely set forth in the claims.

Reference is to be had to the accompanying drawings, forming a part of this specification, in which similar characters of reference indicate corresponding parts in both views.

Figure 1 represents the device in perspective, indicating the same as attached to a clothes-line; and Fig. 2 is a partial side elevation looking in the direction in which the clothes-line extends, so as to illustrate the manner in which the pin may pass into position upon the line.

Referring particularly to the parts, 1 represents the body of the pin, which consists, as shown, of two superposed substantially rectangular frames 2 and 3, the said frames being united at their lower edges to form a hinged connection 4, including a coil-spring 5, said spring being preferably adapted to constrain the frames 2 and 3 apart. The substantially vertical side bars 6 of the frames 2 and 3 coöperate, so as to form jaws 7, opening upwardly, as shown. These bars are preferably offset or bent in wavy lines, as at 8, which construction enhances the efficiency of the jaws, as will be readily understood. It should be stated that the jaws 7 are utilized to support the upper corners of garments, and in order to facilitate the passage of portions of the garments into the said jaws the upper portions of the bars 6 preferably diverge slightly, as indicated. The frames 2 and 3 comprise also substantially horizontal upper bars 9 and 10, which oppose each other, as shown. At substantially the middle point of the bar 10 the same is provided with an upwardly-disposed hook 11, formed with a downwardly-disposed extension 12, which extension preferably terminates below in a lip 13, inclining downwardly and laterally somewhat, as indicated. This hook is preferably formed of two adjacent strands of wire, a portion of which wire constitutes the bar 10. After forming the bar 10 the strands of this wire are preferably twisted together at the base of the hook, as indicated at 14. At a point on the bar 9 substantially opposite to the hook 11 the wire constituting the same is twisted, as at 15, and bent upwardly, so as to form a fork 16, presenting a pair of oppositely-disposed tines 17, the bodies of which tines preferably incline upwardly and outwardly, as indicated, the tips 18 thereof being slightly inclined inwardly, as shown, in the direction of the hook 11. These forks 17, like the hook 11, are preferably formed of two strands of wire, the wire between the said forks being bent, so as to form a bight 19, which normally rests against the inner side of the lip 13 aforesaid.

From an inspection of Fig. 1 it will be observed that the extremity of the downward extension 12 of the hook 11 projects beyond the bight 19. This is for the purpose of facilitating the passage of a clothes-line 20 into the space surrounded by the hook 11. It will be understood that the line would be applied so as to press against the under side of the fork or guard 16 adjacent to the extremity of the extension 12. The clothes-pin is then pulled downwardly, so that the wire will ride along the inner side of the lip 13 and ultimately pass into the space beyond the upper extremities of the tines 17, whereupon the frame 2 will return to its normal position, carrying with it the fork 17, as will be readily understood.

From this construction evidently the clothes-pin may be very quickly applied to a line, and after it has been applied it cannot be accidentally dislodged by the wind. The clothes-pin may after attachment be slid along the line to any point desired. For this reason it is extremely useful in connection with pulley-lines, such as used by persons occupying flats, for moving the clothes out upon the line, which is at a great height from the ground.

Garments may be readily detached from the clothes-pins by pulling the garments upwardly out of the jaws 7. If it is desired to take down the garment at one side of the clothes-pin without disturbing the garment supported in the other side thereof, this may be readily effected by forcing open one of the jaws without disturbing the position of the other, this mode of operation being made possible by the form of the frame and its resilient character.

Having thus described my invention, I claim as new and desire to secure by Letters Patent—

1. A device of the class described comprising a pair of oppositely-disposed frames presenting a pair of oppositely-disposed jaws, said frames making substantial hinged connection together and being resiliently constrained, one of said frames having a hook formed at the upper portion thereof, adapted to overlie a line, the other of said frames having an extension substantially opposite to said hook, operating as a guard therefor.

2. A device of the class described comprising a pair of oppositely-disposed substantially rectangular frames, making substantial hinged connection at their lower edges and presenting a pair of oppositely-disposed jaws, one of said frames having a hook at the upper side thereof, adapted to engage a line, the other of said frames having a fork coöperating with said hook and constituting a guard therefor.

3. A device of the class described comprising a pair of oppositely-disposed substantially rectangular frames, having substantial hinged connection at their lower edges, said hinged connection comprising a resilient coil constraining said frames apart, one of said frames having a hook disposed upwardly therefrom and presenting a downwardly-disposed extension, and the other of said frames having an upwardly-disposed fork engaging said extension and constrained thereagainst by said coil, said fork constituting a guard for said hook.

4. A device of the class described comprising a pair of oppositely-disposed, substantially rectangular frames having a substantial hinged connection at their lower edges, said hinged connection comprising a spring constraining said frames apart, said frames having vertical bars diverging at their upper portions and forming jaws therebetween, said frames having upper horizontal bars, said horizontal bar of one of said frames having an upwardly-disposed hook with a downwardly-disposed extension, said last extension having a downwardly and laterally inclined lip, the said upper bar of the other of said frames having an upwardly-disposed fork presenting tines lying respectively on opposite sides of said downward extension of said hook and presenting a bight resting against said lip, said tines having upwardly and inwardly disposed extremities.

5. A clothes-pin formed of wire and comprising a pair of oppositely-disposed, substantially rectangular frames having a hinged connection comprising a spring constraining said frames apart, said frames having vertical bars diverging at their upper portions and forming jaws therebetween, said frames having upper horizontal bars, said horizontal bar of one of said frames having an upwardly-disposed hook with a downwardly-disposed extension, said last extension having a downwardly and laterally inclined lip, the said upper bar of the other of said frames having an upwardly-disposed fork presenting tines lying respectively on opposite sides of said downward extension of said hook and presenting a bight resting against said lip, said tines having upwardly and inwardly disposed extremities, said hook and said tines being formed of double wire and the wire forming said hook and said fork being twisted at the bases thereof.

In testimony whereof I have signed my name to this specification in the presence of two subscribing witnesses.

JOHN SCOTT BANKS.

Witnesses:
 THOS. M. HODGES,
 R. S. BROOKS.